United States Patent
Lee et al.

(10) Patent No.: US 10,117,277 B2
(45) Date of Patent: Oct. 30, 2018

(54) TERMINAL AND METHOD FOR TRANSMITTING DEVICE TO DEVICE (D2D) SIGNAL FOR D2D COMMUNICATION IN WIRELESS ACCESS SYSTEM SUPPORTING D2D COMMUNICATION

(71) Applicant: LG Electronics Inc., Seoul (KR)

(72) Inventors: Seungmin Lee, Seoul (KR); Hanbyul Seo, Seoul (KR); Jihyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/114,345

(22) PCT Filed: Mar. 19, 2015

(86) PCT No.: PCT/KR2015/002670
§ 371 (c)(1),
(2) Date: Jul. 26, 2016

(87) PCT Pub. No.: WO2015/142074
PCT Pub. Date: Sep. 24, 2015

(65) Prior Publication Data
US 2017/0006652 A1   Jan. 5, 2017

Related U.S. Application Data

(60) Provisional application No. 61/955,776, filed on Mar. 19, 2014.

(51) Int. Cl.
*H04W 76/00*   (2018.01)
*H04W 76/02*   (2009.01)
(Continued)

(52) U.S. Cl.
CPC ........ *H04W 76/023* (2013.01); *H04B 17/318* (2015.01); *H04L 5/0048* (2013.01);
(Continued)

(58) Field of Classification Search
CPC ............. H04W 76/023; H04W 72/085; H04W 72/042; H04W 56/0015; H04W 72/08; H04L 5/0048; H04B 17/318
See application file for complete search history.

(56) References Cited

U.S. PATENT DOCUMENTS

2013/0083684 A1* 4/2013 Yeh, II ............... H04W 8/26
370/252
2014/0003262 A1* 1/2014 He ..................... H04W 28/08
370/252

(Continued)

FOREIGN PATENT DOCUMENTS

JP    2013-150301 A    8/2013
KR    10-2012-0126032 A   11/2012
(Continued)

OTHER PUBLICATIONS

R1-140852: ETRI, "Resource allocation for D2D discovery," 3GPP Draft; Mobile Competence Centre; Prague, Czech Republic, Feb. 10-14, 2014.

(Continued)

*Primary Examiner* — Hassan Kizou
*Assistant Examiner* — Abdullahi Ahmed
(74) *Attorney, Agent, or Firm* — Dentons US LLP

(57) ABSTRACT

Disclosed is a method for transmitting a device to device (D2D) signal for D2D communication by a D2D terminal in a wireless communication system. The method for transmitting the D2D signal may comprise the steps of: selecting a specific resource set on a D2D resource area configured for the D2D communication; and transmitting the D2D signal using at least one wireless resource corresponding to the particular resource set, wherein the D2D resource area includes a plurality of resource sets, and the plurality of resource sets are individually associated with different cells and correspond to different resource regions on a time domain.

12 Claims, 9 Drawing Sheets

(51) Int. Cl.
*H04W 72/08* (2009.01)
*H04B 17/318* (2015.01)
*H04L 5/00* (2006.01)
*H04W 56/00* (2009.01)
*H04W 72/04* (2009.01)
*H04W 76/14* (2018.01)

(52) U.S. Cl.
CPC ..... *H04W 56/0015* (2013.01); *H04W 72/042* (2013.01); *H04W 72/08* (2013.01); *H04W 72/085* (2013.01); *H04W 76/14* (2018.02)

(56) References Cited

U.S. PATENT DOCUMENTS

| | | | |
|---|---|---|---|
| 2015/0215903 A1* | 7/2015 | Zhao | H04W 72/04 370/329 |
| 2016/0157172 A1* | 6/2016 | Jeong | H04W 76/023 370/329 |

FOREIGN PATENT DOCUMENTS

| | | |
|---|---|---|
| KR | 10-2013-0121052 A | 11/2013 |
| WO | 2012-061251 A1 | 5/2012 |
| WO | 2012159270 A1 | 11/2012 |
| WO | 2011-129448 A1 | 7/2013 |
| WO | 2013109100 A1 | 7/2013 |
| WO | 2013162345 A1 | 10/2013 |
| WO | 2013177179 A1 | 11/2013 |
| WO | 2014018333 A2 | 1/2014 |

OTHER PUBLICATIONS

R1-135481: LG Electronics, "Discussion on Resource Allocation in D2D Communications," pp. 1-15, 3GPP TSG RAN WG1 Meeting #75, San Francisco, Nov. 11-15, 2013.

\* cited by examiner

FIG. 7
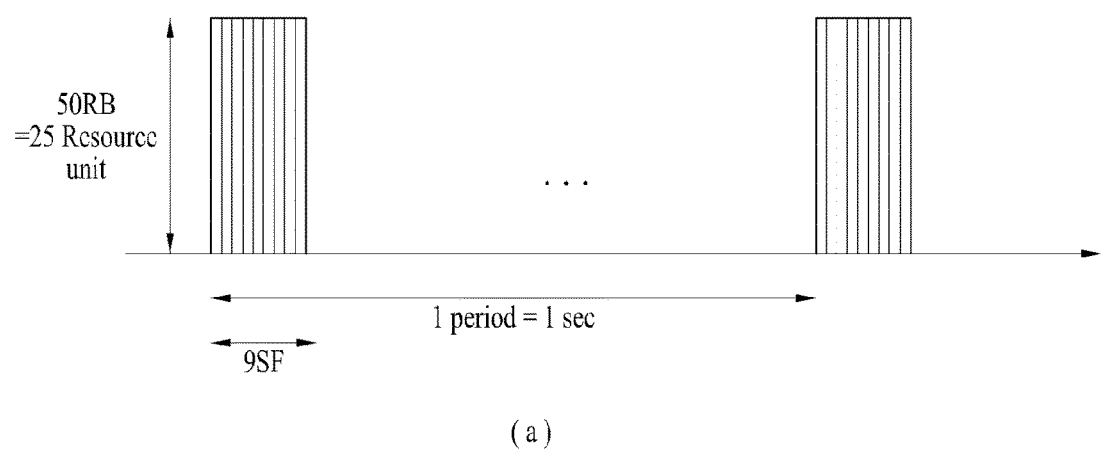
(a)
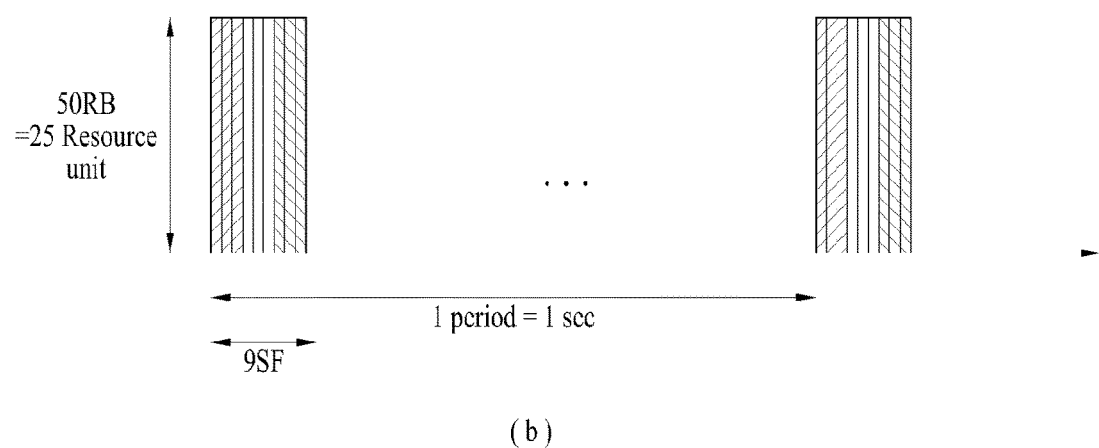
(b)

FIG. 8
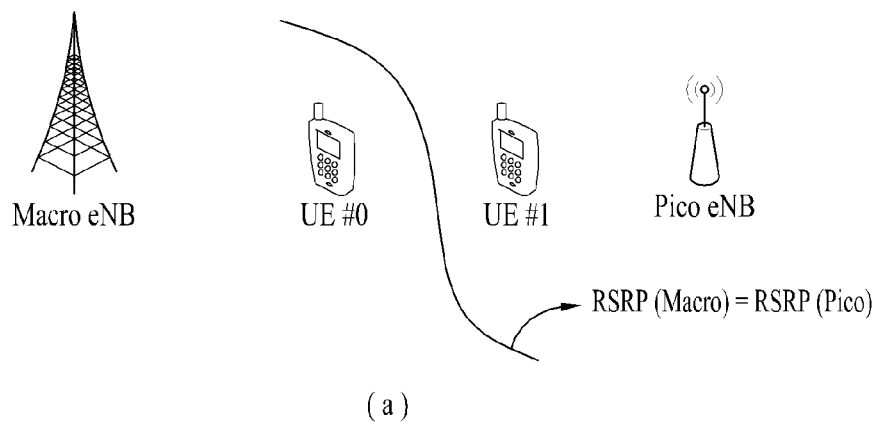
(a)
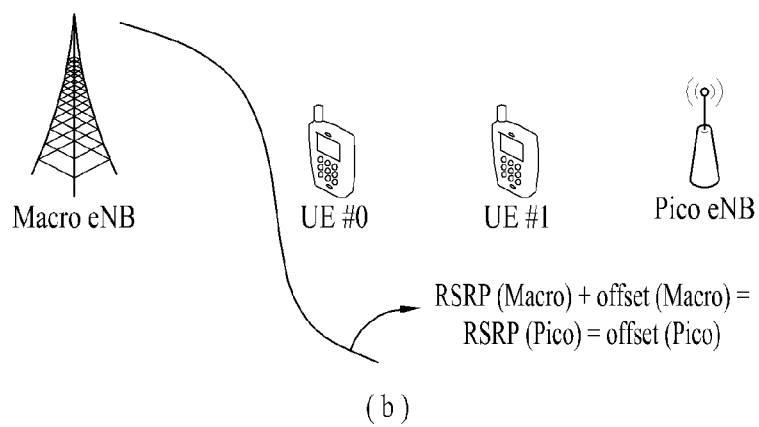
(b)

TERMINAL AND METHOD FOR TRANSMITTING DEVICE TO DEVICE (D2D) SIGNAL FOR D2D COMMUNICATION IN WIRELESS ACCESS SYSTEM SUPPORTING D2D COMMUNICATION

This application is a 35 USC § 371 National Stage entry of International Application No. PCT/KR2015/002670 filed on Mar. 19, 2015, and claims priority to U.S. Provisional Application No. 61/955,776 filed Mar. 19, 2014, all of which are hereby incorporated by reference in their entireties as if fully set forth herein.

TECHNICAL FIELD

The present invention relates to a wireless access system, and more particularly to a method for selecting a resource set of a Device-to-Device User Equipment (D2D UE) in a wireless communication system supporting D2D communication.

BACKGROUND ART

Recently, with the spread of smartphones and tablet PCs and activation of high-capacity multimedia communication, mobile traffic has significantly increased. Mobile traffic is expected to double every year. Since most mobile traffic is transmitted through a base station (BS), communication service operators are being confronted with serious network load. To process increasing traffic, communication operators have installed networks and accelerated commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between contiguous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to ability thereof to cope with traffic overload by distributing traffic converging upon the BS. For this reason, a standardization institute such as 3rd generation partnership (3GPP) or institute of electrical and electronics engineers (IEEE) is establishing D2D communication standards based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

In fact, D2D communication, such as infrared communication, ZigBee, radio frequency identification (RFID), and near field communication (NFC) based on RFID, has already been widely used. However, strictly speaking, it is difficult for these technologies to be classified as D2D communication for decentralizing traffic of a BS because they support only special communication purposes within a significantly limited distance (around 1 m).

While D2D communication has been described hereinabove, a method for distributing resources of D2D communication has not been proposed in detail up to now.

DISCLOSURE

Technical Problem

An object of the present invention is to provide a method for performing communication using a D2D resource region composed of a plurality of resource sets (or resource aggregates) in a wireless communication system supporting D2D communication.

Another object of the present invention is to provide a method for distributing radio resources to contiguous cells in a wireless communication system supporting D2D communication.

Another object of the present invention is to provide a method for synchronizing a D2D signal of a user equipment (UE) in a wireless communication system supporting D2D communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for transmitting a Device-to-Device (D2D) signal by a first user equipment (UE) for D2D communication in a wireless communication system, the method including: selecting a specific resource set in a D2D resource region configured for the D2D communication; and transmitting the D2D signal using at least one radio resource corresponding to the specific resource set, wherein the D2D resource region includes a plurality of resource sets, the plurality of resource sets are associated with different cells to each other and correspond to different resource regions in a time domain.

In another aspect of the present invention, a user equipment (UE) for transmitting a Device-to-Device (D2D) signal for D2D communication in a wireless communication system includes: a radio frequency (RF) unit; and a processor. The processor if configured to: select a specific resource set in a D2D resource region configured for the D2D communication, and transmit the D2D signal using at least one radio resource corresponding to the specific resource set. The D2D resource region includes a plurality of resource sets, and the plurality of resource sets are associated with different cells to each other and correspond to different resource regions in a time domain.

Advantageous Effects

As is apparent from the above description, the embodiments of the present invention can improve resource use efficiency of a D2D communication system.

In addition, the embodiments of the present invention can provide higher D2D communication quality through spatial separation of D2D UEs.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 7 is a conceptual diagram illustrating D2D resource allocation according to an embodiment of the present invention.

FIG. 8 is a conceptual diagram illustrating a D2D resource set (or aggregate) according to an embodiment of the present invention.

BEST MODE

Figure 1:
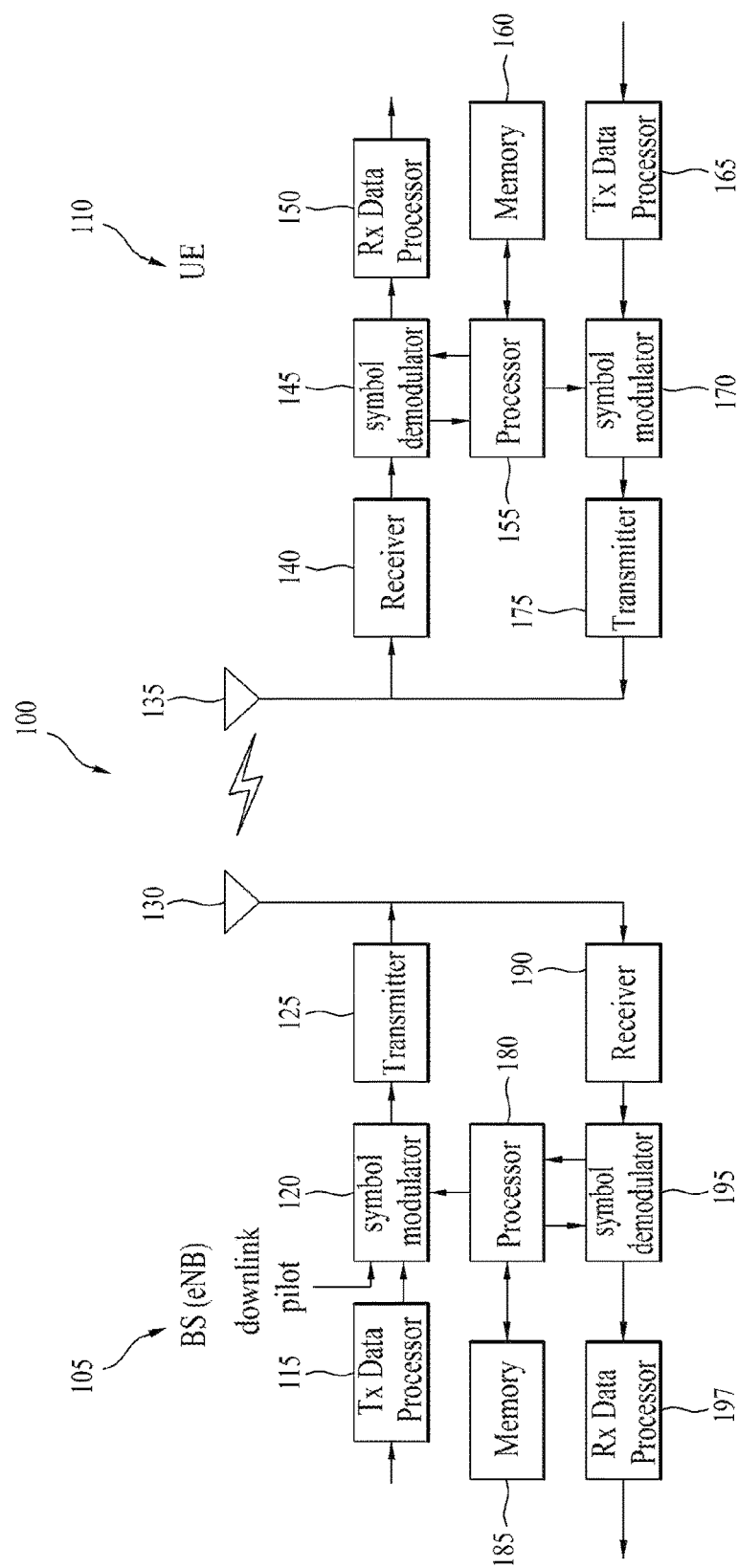
FIG. 1 is a block diagram illustrating configurations of a base station (BS) and a user equipment (UE) in a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

Specific terms used for the embodiments of the present invention are provided to help the understanding of the present invention. These specific terms may be replaced with other terms within the scope and spirit of the present invention.

FIG. 1 is a block diagram illustrating configurations of a base station 105 and a user equipment 110 in a wireless communication system.

Although one base station 105 and one user equipment (e.g., D2D UE) 110 are shown for simplification of a wireless communication system 100, the wireless communication system 100 may include one or more base stations and/or one or more user equipments.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The user equipment 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the user equipment through the antenna 130.

In the configuration of the user equipment 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

While the UE processor 155 enables the UE 110 to receive signals and can process other signals and data, and the BS processor 180 enables the BS 105 to transmit signals and can process other signals and data, the processors 155 and 180 will not be specially mentioned in the following description. Although the processors 155 and 180 are not specially mentioned in the following description, it should be noted that the processors 155 and 180 can process not only data transmission/reception functions but also other operations such as data processing and control.

LTE/LTE-A Resource Structure/Channel

Figure 2:
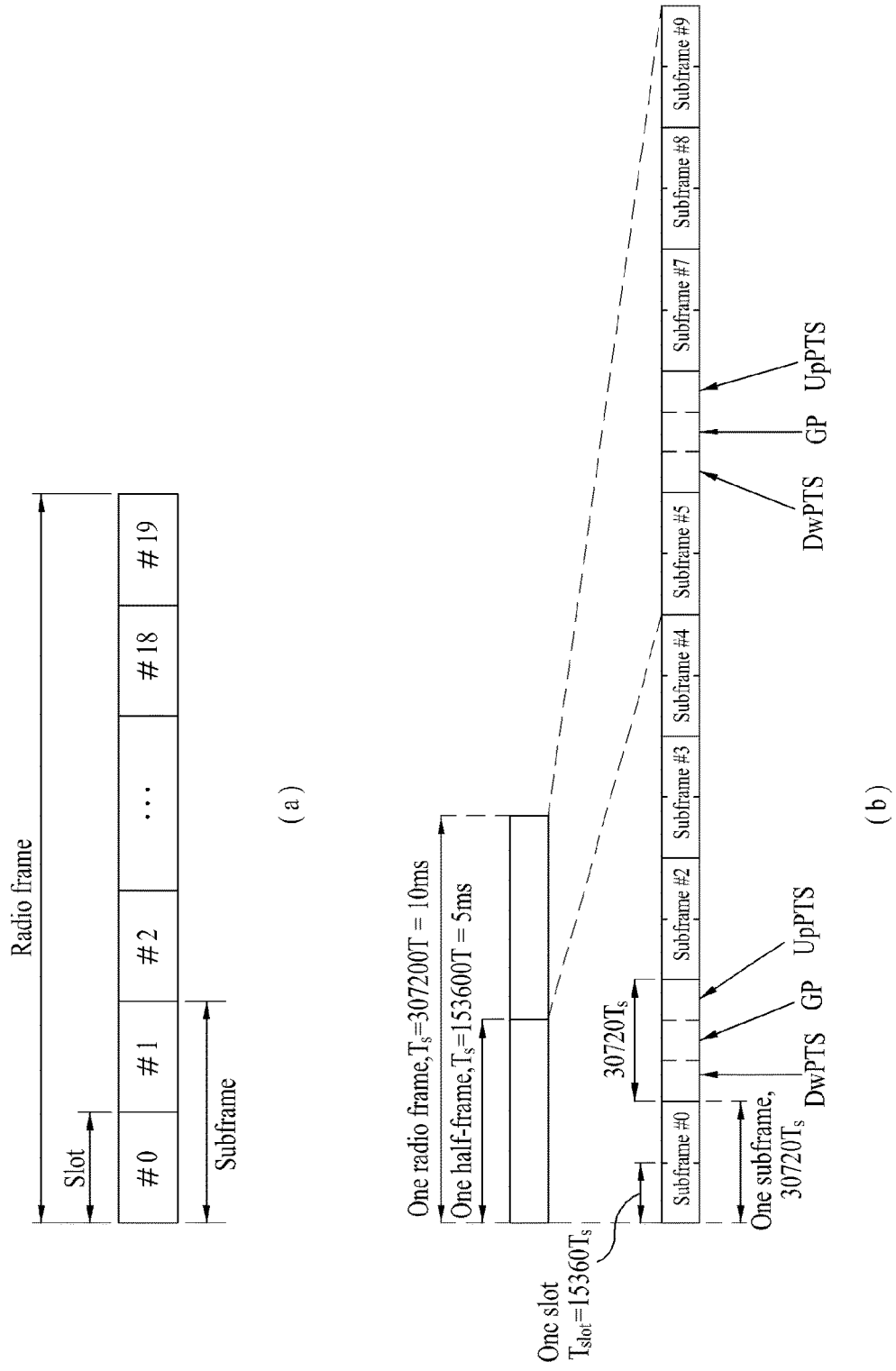
FIG. 2 exemplarily shows a radio frame structure.

A radio frame structure will now be described with reference to FIG. 2.

In a cellular OFDM wireless packet communication system, an uplink/downlink data packet is transmitted on a eme basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 2(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

FIG. 2(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 3:
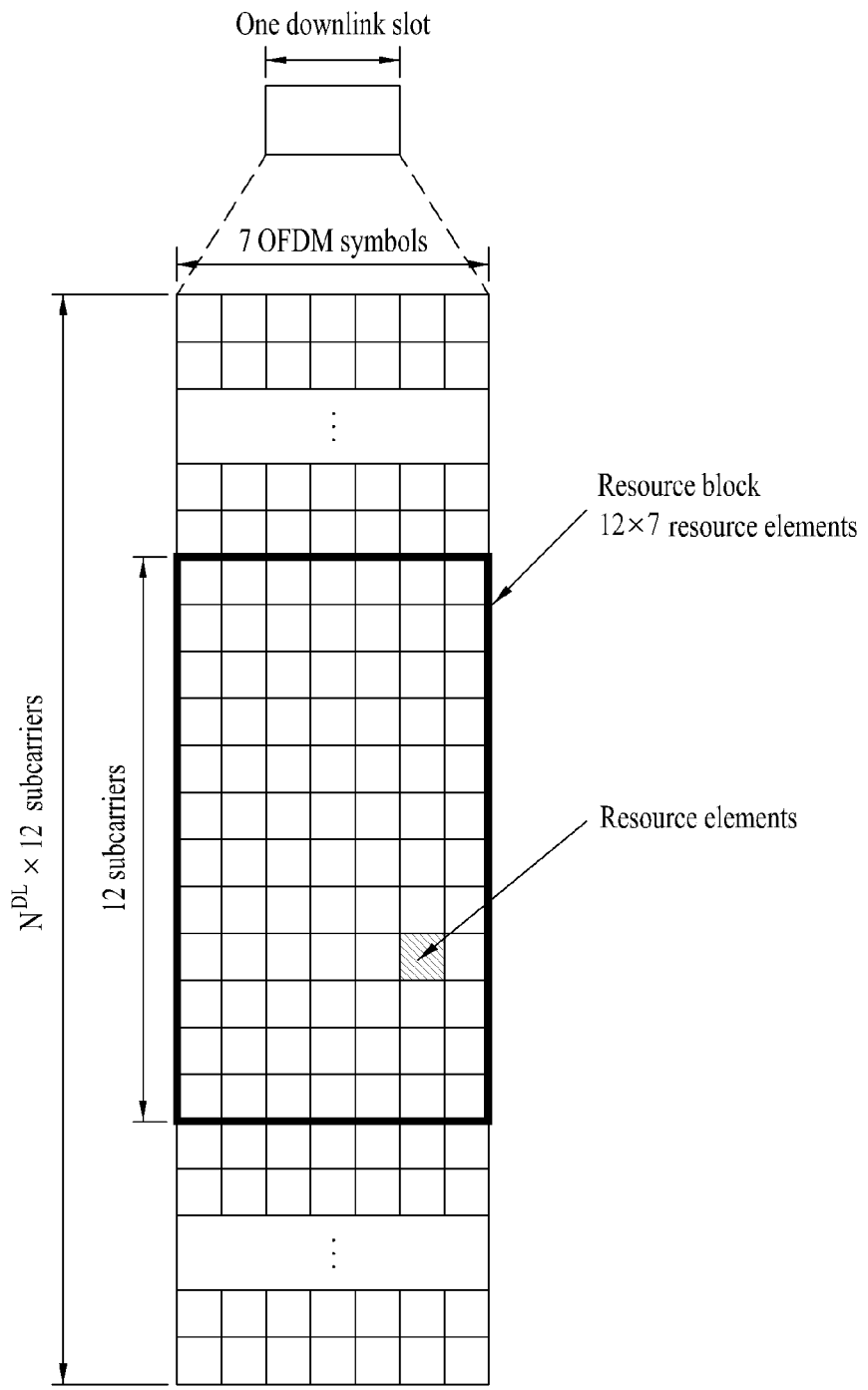
FIG. 3 exemplarily shows a resource grid of one downlink slot.

FIG. 3 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 4:
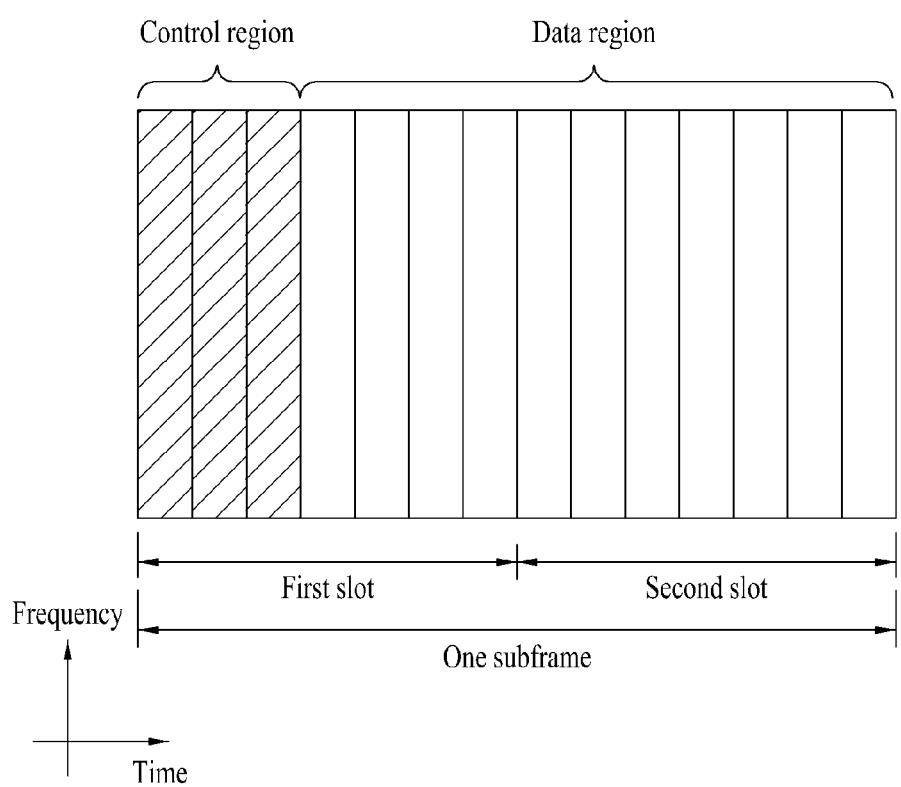
FIG. 4 exemplarily shows a downlink (DL) subframe structure.

FIG. 4 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 5:
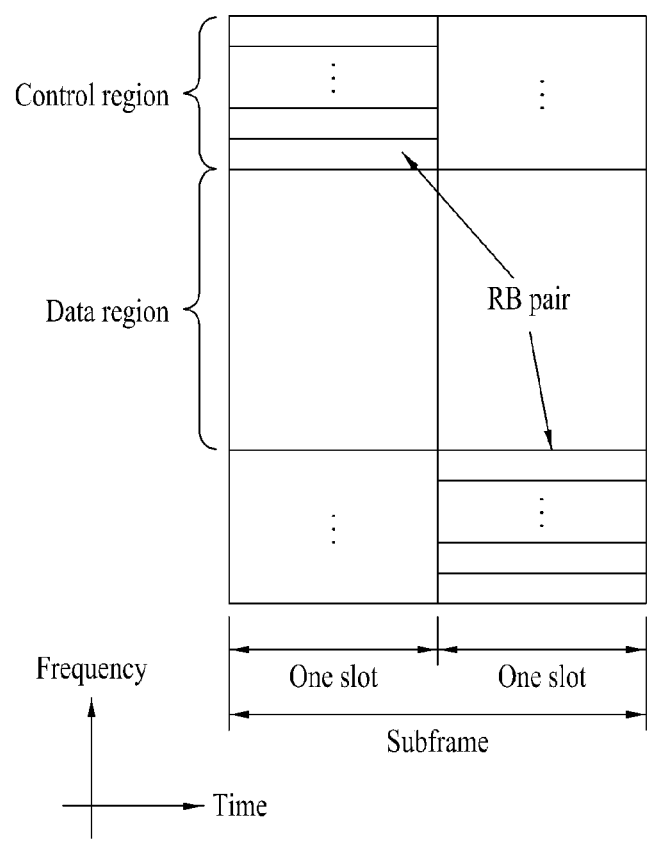
FIG. 5 exemplarily shows an uplink (UL) subframe structure.

FIG. 5 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

An SRS is used for channel quality estimation to enable frequency-selective scheduling on uplink. At this time, SRS transmission is performed regardless of uplink data transmission and/or uplink control information transmission. The SRS may be used for the purpose of enhancing power control or supporting various start-up functions for UEs not recently scheduled. For example, the various start-up functions include initial modulation and coding scheme (MCS) selection, initial power control for data transmission, timing advance (TA), and so-called frequency semi-selective scheduling. At this time, frequency semi-selective scheduling means that the frequency resource is assigned selectively for the first slot of a subframe and hops pseudorandomly to a different frequency in the second slot.

In addition, the SRS may be used for downlink channel quality estimation under the assumption that the wireless channel is reciprocal between uplink and downlink. This assumption is especially valid in a time division duplex (TDD) system where the uplink and downlink share the same frequency spectrum and are separated in the time domain.

The subframes in which SRSs are transmitted by any UE within the cell are indicated by cell-specific broadcast signaling. A 4-bit cell-specific 'srsSubframeConfiguration' parameter indicates 15 possible sets of subframes in which an SRS may be transmitted within each radio frame. This configurability provides flexibility in adjusting the SRS overhead depending on network deployment scenario. A $16^{th}$ configuration switches the SRS completely off in the cell, which may for example be appropriate for a cell serving primarily high-speed UEs.

Figure 6:
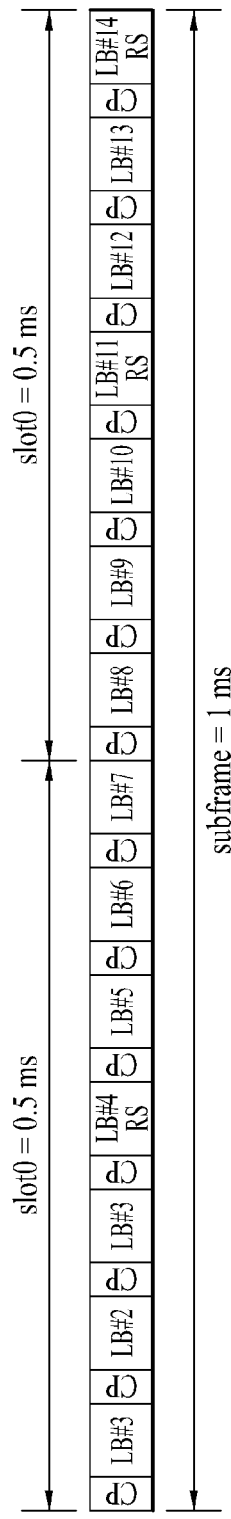
FIG. 6 is a conceptual diagram illustrating an uplink (UL) subframe including a Sounding Reference Signal (SRS) symbol.

As illustrated in FIG. 6, the SRS transmissions are always performed in the last SC-FDMA symbol in the configured subframes. Thus, the SRS and DM RS are located in different SC-FDMA symbols. PUSCH data transmission is not permitted on the SC-FDMA symbol designated for SRS, resulting in a worst-case sounding overhead of up to 7% in every subframe.

Each SRS symbol is generated by basis sequences (random sequence or ZC(Zadoff-Chu)—based sequence set) where for a given time instance and bandwidth all the UEs in a cell use the same basis sequence while SRS transmissions from multiple UEs in the same time and frequency band in a cell are distinguished orthogonally by different cyclic shifts of the basis sequence assigned to different UEs. SRS sequences from different cells can be distinguished by assigning different basis sequences in different cells where orthogonality is not guaranteed between different basis sequences.

Reference Signal Received Power (RSRP)

RSRP may be defined as a linear average of power of resource elements (REs) carrying a cell-specific RS (CRS) within a measured frequency bandwidth. UE may determine RSRP by detecting CRS that is mapped to a specific resource element and then transmitted. For RSRP determination, a cell-specific RS (R0) for Antenna Port #0 may be used basically. If the UE can reliably detect the CRS (R1) for Antenna Port #1, R1 may be additionally used for R0 such that RSRP may be determined. For details of the cell-specific RS (CRS), refer to the standard documents (e.g., 3GPP TS36.211).

LTE Carrier Received Signal Strength Indicator (RSSI)

RSSI may be defined as total reception (Rx) broadband power sensed from all sources that include a co-channel serving cell and non-serving cell, contiguous channel interference, thermal noise, etc. within a measurement band observed by a UE. RSSI may be used as an input of Reference Signal Received Quality (RSRQ).

Reference Signal Received Quality (RSRQ)

RSRQ may provide a cell-specific signal quality characteristic, and may be similar to RSRP. However, RSRQ may be used to rank different LTE candidate cells according to signal qualities of respective cells. For example, if RSRP measurement provides information that is considered insufficient to perform stable mobility determination, an RSRQ measurement value may be used as an input signal for a handover and cell reselection determination. RSRQ is defined as N×RSRP/E-UTRA carrier RSSI (Received Signal Strength Indicator). Here, N is the number of resource blocks (REs) within a measured frequency bandwidth. In addition, in the aforementioned formula, measurement of the numerator (N×RSRP) and the denominator (E-UTRA carrier RSSI) may be achieved from a set of the same RB set. Whereas RSRP is an indicator of a desired signal strength, RSRQ may be used to effectively report the combination effect of signal strength and interference in consideration of an interference level contained in RSSI.

Various embodiments related to D2D communication (also called D2D direct communication) will hereinafter be given. Although D2D communication will hereinafter be described based on 3GPP LTE/LTE-A, it should be noted that D2D communication may also be applied to other communication systems (IEEE 802.16, WiMAX etc.).

D2D Communication Type

D2D communication may be classified into Network coordinated D2D communication and Autonomous D2D communication according to whether D2D communication is executed under network control. The network coordinated D2D communication may be classified into a first type (Data only in D2D) in which D2D communication is used to transmit only data and a second type (Connection Control only in Network) in which the network performs only access control according to the degree of network intervention. For convenience of description, the first type will hereinafter be referred to as a Network Centralized D2D communication type, and the second type will hereinafter be referred to as a distributed D2D communication type.

In the Network Centralized D2D communication type, only data is exchanged between D2D UEs, and connection control between D2D UEs and radio resource allocation (grant message) may be carried out by the network. D2D UEs may transmit and receive data and specific control information using radio resources allocated by the network. For example, HARQ ACK/NACK feedback for data reception between D2D UEs, or Channel State Information (CSI) may not be directly exchanged between the D2D UEs, and may be transmitted to another D2D UE over the network. In more detail, if the network configures a D2D link between D2D UEs and allocates radio resources to the configured D2D link, a transmission D2D UE and a reception D2D UE may perform D2D communication using radio resources. In other words, in the network centralized D2D communication type, D2D communication between D2D UEs may be controlled by the network, and D2D UEs may perform D2D communication using radio resources allocated by the network.

The network in the distributed D2D communication type may perform a more limited role than a network in the network centralized D2D communication type. Although the network of the distributed D2D communication type performs access control between D2D UEs, radio resource allocation (grant message) between the D2D UEs may be autonomously occupied by competition of the D2D UEs without the help of the network. For example, HARQ ACK/NACK or CSI in association with data reception between D2D UEs may be directly exchanged between the D2D UEs without passing through the network.

As illustrated in the above example, D2D communication may be classified into network centralized D2D communication and distributed D2D communication according to the degree of D2D communication intervention of the network. In this case, the network centralized D2D communication type and the distributed D2D communication type are characterized in that D2D access control is performed by the network.

In more detail, the network for use in the network coordinated D2D communication type may configure a D2D link between the D2D UEs scheduled to perform D2D communication, such that connection between the D2D UEs may be constructed. When configuring a D2D link between the D2D UEs, the network may assign a physical D2D link identifier (LID) to the configured D2D link. When plural D2D links are present between the D2D UEs, the physical D2D link ID may be used as an ID for identifying each D2D link.

Unlike the network centralized and distributed D2D communication types, the autonomous D2D communication type may allow the D2D UEs to perform D2D communication freely without the help of the network. That is, unlike the network centralized and distributed D2D communication types, the autonomous D2D communication type may control the D2D UE to autonomously perform access control and radio resource occupancy. If necessary, the network may also provide the D2D UE with D2D channel information capable of being used in the corresponding cell.

Discovery of D2D UE

For convenience of description, a UE, which is scheduled to perform or can perform D2D communication including D2D direct communication, will hereinafter be referred to as a D2D UE. If a transmitter and a receiver need to be distinguished from each other, a D2D UE, which is scheduled to transmit or can transmit data to another D2D UE using radio resources allocated to the D2D link during D2D communication, will hereinafter be referred to as a transmission (Tx) D2D UE, or another UE, which is scheduled to receive or can receive data from the Tx D2D UE, will hereinafter be referred to as a reception (Rx) D2D UE. If a plurality of D2D UEs, which is scheduled to receive or can receive data from the Tx D2D UE, is used, the Rx D2D UEs may also be identified by ordinal numerals such as "$1^{st}$ $N^{th}$". For convenience of description, either a base station (BS) for controlling access between the D2D UEs or allocating radio resources to the D2D link or a node (such as a D2D server, and an access/session management server) located at a network stage will hereinafter be referred to as a network.

D2D UE scheduled to perform D2D communication needs to pre-recognize the presence or absence of neighbor D2D UEs capable of transmitting and receiving data so as to transmit data to another D2D UE through D2D communication. For this purpose, the D2D UE may perform D2D peer discovery. The D2D UE may perform D2D discovery within a discovery interval, and all D2D UEs may share the discovery interval. The D2D UE may monitor logical channels of a discovery region within the discovery interval, and may thus receive D2D discovery signals from other D2D UEs. D2D UEs having received a transmission (Tx) signal from another D2D UE may construct the list of neighbor D2D UEs using a reception (Rx) signal. In addition, D2D UE may broadcast its own information (i.e., ID) within the discovery interval, and other D2D UEs may receive the broadcast D2D discovery signal, such that the presence of the corresponding D2D UE in a D2D communication available range may be recognized.

Allocation of D2D Transmission Resources

For example, D2D UEs may perform D2D transmission (and/or D2D reception) on a pre-established (or signaled) D2D resource region, and, thus, proper distribution of D2D Tx resources is needed. For distribution of D2D Tx resources, the base station (BS) may receive a D2D indication/request signal or D2D data buffer state information from the D2D UE, such that the BS may recognize the number (N) of D2D UEs scheduled to perform D2D communication with a specific D2D UE within the cell. The BS having recognized the number (N) of D2D UEs scheduled to perform D2D communication may allocate resources for allowing each D2D UEs to transmit a D2D communication request signal, and broadcast configuration information of the allocated resource region the D2D UE.

FIG. 7 is a conceptual diagram illustrating D2D resource allocation according to an embodiment of the present invention.

In FIG. 7, the D2D resource region may include 9 subframes, each of which includes 50 resource blocks (RBs), and 450 resource regions are allocated for D2D signal transmission. In addition, the D2D signal may be transmitted every second. The D2D signal is used for transmission/reception of D2D communication. For example, the D2 signal may be used for data transmission/reception on D2D communication resources, transmission/reception of the D2D discovery signal, etc. The configuration of the D2D resource region and a transmission period of the D2D resource region illustrated in FIG. 7 are disclosed only for illustrative purposes. For example, the D2D resource region may also be composed of 10 subframes as stated above with regard to FIG. 2.

As shown in FIG. 7(a), an entire D2D resource region interval is allocated to the D2D UE, and the D2D UE may select radio resources for D2D signal transmission within the entire D2D resource region. In addition, the D2D UE may also broadcast the D2D signal on the selected Tx resources. For example, the D2D signal may include an ID of the D2D UE. However, if different D2D UEs select Tx resources having orthogonal frequencies in the same time domain, performance deterioration may occur due to inband emission irrespective of orthogonality on the frequency domain.

In order to reduce inband emission, the D2D resource region may be composed of a plurality of resource sets. For example, as illustrated in FIG. 7(b), the D2D Tx resource region may also be composed of 3 resource sets. In addition, respective resource sets may correspond to different resource regions in the time domain. The D2D resource region is divided into several regions in the time domain, resulting in formation of the respective resource sets. In addition, each D2D UE may also select the D2D resource region within a predetermined resource set. Therefore, the D2D UEs having selected different resource sets may broadcast different D2D signals in the time domain. For example, the D2D signal may include an ID of the D2D UE. D2D Tx resources are divided into several sections in the time domain, such that in-band emission may be reduced between the different D2D UEs having selected different resource sets.

In addition, the respective D2D resource sets may be associated with different cells. The base station (BS) may include information regarding the resource set contained in the above-mentioned D2D Tx resources. For example, the D2D resource set associated with each cell may be predetermined Specifically, the D2D resource set to which TDM is applied is allocated to contiguous cells in consideration of cell deployment, such that performance deterioration caused by in-band emission or interference may be reduced.

The configuration of the D2D resource set associated with each cell may be directly or indirectly recognized by each D2D UE. For example, the D2D resource set associated with the corresponding cell may be obtained on the basis of the cell ID. In addition, the D2D resource set associated with each cell may also be determined on the basis of the numerals contained in the cell ID and the number of D2D resource regions. For example, the D2D resource set to be associated with the corresponding cell may be determined through modulo operation between the predetermined number of D2D resource sets and the cell ID. For example, the number allocated to the cell ID may be 7 and five D2D resource sets may exist. In this case, the remainder (i.e., the corresponding cell) obtained when the numeral "7" is divided by the number of D2D resource sets may be associated with a second D2D resource set. For example, the code related to the D2D resource set of the corresponding cell is inserted into the cell ID, such that the D2D UE may indirectly derive the D2D resource set of the corresponding cell on the basis of the cell ID. In addition, information regarding the configuration of the D2D resource set may be directly contained in broadcast information such as SIB (System Information Block), UE-specific D2D control information, or D2D group-specific D2D control information, and may then be transferred to the D2D UE.

In the meantime, as described below, when deciding the D2D resource set of the D2D UE, an offset of each cell may be considered. The offset of each cell may be predetermined. For example, an offset of each cell may be predetermined according to the type of each cell and/or the ID of each cell. In addition, the offset of each cell may be reconfigured or configurable for each cell. In addition, the offset of each cell may be derived from the type of each cell and/or the ID of each cell. In addition, the offset of each cell may be directly contained in broadcast information such as SIB, UE-specific D2D control information, or D2D group-specific D2D control information, and may then be transferred to the D2D UE.

Determination of D2D Resource Set

If the D2D resource region includes a plurality of D2D resource sets, the D2D UE may be based on the D2D resource set designated by its own serving cell without change. The serving cell may also be decided by a general method. For example, the serving cell may also be determined on the basis of the RSRP measurement value.

In addition, the D2D UE may also select the D2D resource set associated with the cell having the best radio link quality. That is, the D2D UE may use the radio link quality such as RSRP as a reference for D2D resource set selection. For example, the D2D UE may also select the D2D resource set associated with the cell having the best RSRP measurement value. The cell having the best RSRP measurement value may be the serving cell of the D2D UE.

In addition, the D2D UE may perform RSRP measurement using the cell-specific offset, or may determine the D2D resource set using the cell-specific offset. FIG. 8 is a conceptual diagram illustrating selection of a D2D resource set according to an embodiment of the present invention.

In FIG. 8(*a*), the serving cell of the first UE (UE #0) may be a macro cell based on the macro eNB (Macro eNB). In addition, the serving cell of the second D2D UE (UE #1) may be a pico cell based on the pico eNB (pico eNB). In FIG. 8(*a*), the region in which RSRP of the macro cell is identical to RSRP of the pico cell may be denoted by a curved line. The first D2D UE (UE #0) may be located closer to the macro eNB on the basis of the region in which the macro cell and the pico cell have the same RSRP. Therefore, an RSRP measurement value of the macro cell measured by the first D2D UE (UE #0) may be higher than an RSRP measurement value of the pico cell. In this case, the first D2D UE (UE #0) may determine the D2D Tx resources according to the D2D resource set related to the macro cell. In addition, the second D2D UE (UE #1) may be located closer to the pico eNB on the basis of the region in which RSRP of the macro cell is identical to RSRP of the pico cell. Therefore, the RSRP measurement value of the pico cell measured by the second D2D UE (UE #1) may be higher than the RSRP measurement value of the macro cell. In this case, the second D2D UE (UE #1) may also determine the D2D Tx resources according to the D2D resource set related to the pico cell.

However, as described above, the D2D UE may consider the cell-specific offset along with the RSRP measurement value. For example, according to heterogeneous network deployment, a higher offset may be applied to smaller-sized cells. That is, the size of a cell coverage region may be inversely proportional to the offset of the corresponding cell. In FIG. 8(*b*), for example, the pico cell may have a higher offset than the macro cell. In FIG. 8(*b*), the region in which the sum of RSRPs of respective cells is identical to the sum of offsets of the respective cells may also be located between the first D2D UE (UE #0) and the macro eNB. Therefore, the sum of RSRP and offset of the macro cell measured by the first D2D UE (UE #0) may be less than the sum of RSRP and offset of the pico cell. In this case, the first D2D UE (UE #0) may determine the D2D Tx resources according to the D2D resource set associated with the pico cell. Therefore, the first D2D UE (UE #0) and the second D2D UE (UE #1) may determine the D2D Tx resources according to the D2D resource set related to the pico cell.

The offset of each cell may be predetermined, and may be derived from the type of each cell and/or the ID of each cell. The D2D UE may confirm the type (e.g., macro cell, pico cell, etc.) of the corresponding cell and/or the cell ID, such that the D2D UE may derive the offset of the corresponding cell. In addition, the offset of each cell may be directly contained in broadcast information such as SIB, UE-specific D2D control information, or D2D group-specific D2D control information, and may then be transmitted to the D2D UE The serving cell of the D2D UE may also be different from the cell having the best RSRP. For example, if the RSRP value of the contiguous cell is higher than the RSRP value of the serving cell by a predetermined level, the measurement report may be triggered. When cell reselection (or handover) is performed when the RSRP value of the serving cell is lower than a predetermined threshold value or less, the RSRP value of the contiguous cell may also be higher than the RSRP value of the serving cell.

Figure 9:
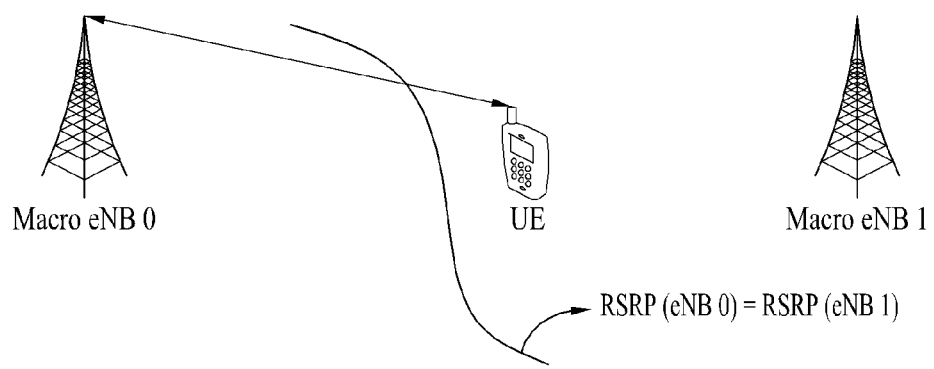
FIG. 9 is a conceptual diagram illustrating selection of a D2D resource set and a serving cell according to an embodiment of the present invention.

Referring to FIG. 9, the serving cell of the D2D UE (UE) may be denoted by 'Macro eNB 0'. However, as shown in FIG. 9, a contiguous cell (Macro eNB 1) of the D2D UE (UE) may also have a superior RSRP. A method for selecting the D2D resource set of the D2D UE, when RSRP of the cell (e.g., the contiguous cell) instead of the serving cell is superior to RSRP of the serving cell, will hereinafter be given.

If the RSRP value (or the sum of RSRP and offset) of the contiguous cell is higher than the RSRP value (or the sum of RSRP and offset) of the serving cell, the D2D UE may determine synchronization of D2D Tx resources and D2D signal transmission.

First, the D2D UE may also select the D2D Tx resource contained in the D2D resource set related to the cell having the highest RSRP value (or the sum of RSRP and offset). As described above, if the D2D UE uses the D2D resource set related to the cell having the highest RSRP value (or the sum of RSRP and offset), geographical distribution of D2D UEs configured to use different D2D resource sets may be isolated. In this case, the D2D UE may also transmit the D2D signal according to time of the cell having the highest RSRP value (or the sum of RSRP and offset) and/or frequency synchronization.

However, if RRC (Radio Resource Control) connection is configured in the D2D UE, the D2D UE transmits signals according to synchronization of the serving cell, such that an additional synchronous circuit needed to transmit the D2D signal may be requested according to synchronization of the contiguous cell (e.g., the cell having the best RSRP value). Accordingly, it may be relatively difficult to change transmission (Tx) synchronization of the D2D UE in which RRC is configured, and costs and/or complexity for implementing the additional synchronous circuit may be encountered. The above-mentioned method may also be appropriate for the D2D UE staying in the RRC idle state.

In addition, the D2D UE selects the D2D Tx resource contained in the D2D resource set related to the cell having the highest RSRP value (or the sum of RSRP and offset), and time and/or frequency synchronization of the D2D UE may also be based on those of the serving cell. It may be relatively difficult to change transmission (Tx) synchronization using the D2D UE in which RRC is configured, and costs and/or complexity for implementing the additional synchronous circuit may occur, such that the above-mentioned method may be appropriate for the D2D UE in which RRC is configured.

Therefore, the D2D UE selects the D2D Tx resources contained in the D2D resource set related to the cell having the highest RSRP value (or the sum of RSRP and offset), and time and/or frequency synchronization may be selected in different ways according to whether RRC connection is configured. For example, the D2D UE in the RRC idle state may also perform D2D signal transmission according to time and/or frequency synchronization of the cell having the highest RSRP value (or the sum of RSRP and offset), and/or according to the D2D resource set. In addition, for example, the D2D UE in which RRC connection is configured may perform D2D signal transmission according to the D2D resource set related to the cell (and/or the serving cell) having the highest RSRP value (or the sum of RSRP and offset), or according to time and/or frequency synchronization of the serving cell.

However, although the RSRP value (or the sum of RSRP and offset) of the contiguous cell is higher than the RSRP value (or the sum of RSRP and offset) of the serving cell, the D2D UE (e.g., D2D UE in which RRC connection is configured) may also perform D2D signal transmission using the D2D resource set of the serving cell according to time and/or frequency synchronization of the serving cell. If D2D signal transmission is carried out using the time and/or frequency synchronization of the serving cell, the D2D UE scheduled to receive the D2D may perform blind search within the frequency and/or time error range which is pre-configured or signaled, and may detect/receive the D2D signal received from another D2D UE.

In the above-mentioned embodiments, the rule to be restrictively applied to the D2D search signal Tx/Rx operation (and/or D2D communication signal Tx/Rx operation) may be defined. In addition, in the above-mentioned embodiments, the rule may be defined in a manner that the above-mentioned embodiments can be restrictively applied to the case in which D2D communication is carried out in the network coverage (and/or the case in which D2D communication is performed outside of the network coverage).

The above-described embodiments correspond to combinations of elements and features of the present invention in prescribed forms. In addition, the respective elements or features may be considered selective unless explicitly mentioned otherwise. Each of the elements or features can be implemented in a form failing to be combined with other elements or features. Moreover, it is possible to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention as described above are applicable to various mobile communication systems.

The invention claimed is:

1. A method for transmitting a Device-to-Device (D2D) signal by a first user equipment (UE) for D2D communication in a wireless communication system, the method comprising:
    selecting a resource set among a plurality of resource sets configured for the D2D communication; and
    transmitting the D2D signal using at least one radio resource corresponding to the resource set,
    wherein a reference cell for synchronization for transmitting the D2D signal is determined, among cells associated with the plurality of resource sets, based on whether the first UE is in a Radio Resource Control (RRC) IDLE state.

2. The method according to claim 1, wherein:
    a configuration of the plurality of resource sets in the D2D resource region is determined based on identifiers of cells associated with the plurality of resource sets.

3. The method according to claim 1, wherein a configuration of the plurality of resource sets in a D2D resource region is contained in at least one of a system information block (SIB), UE-specific D2D control information, or D2D group-specific D2D control information, and is received from a base station (BS).

4. The method according to claim 1, wherein:
when a Radio Resource Control (RRC) connection is configured in the first UE, the selected resource set is a resource set related to a serving cell of the first UE; and
the D2D signal is transmitted based on time synchronization of a serving cell of the first UE.

5. The method according to claim 1, wherein the selected resource set is a resource set related to a cell having a maximum sum of Reference Signal Received Power (RSRP) and an offset from among a plurality of cells related to the plurality of resource sets.

6. The method according to claim 5, wherein an offset of each cell related to the plurality of resource sets is inversely proportional to a coverage size of the cell.

7. The method according to claim 5, wherein an offset of each cell related to the plurality of resource sets is contained in at least one of a system information block (SIB), UE-specific D2D control information, or D2D group-specific D2D control information, and is received from a base station (BS).

8. The method according to claim 1, wherein the resource set is selected based on reference signal received power (RSRP) of the cells associated with the plurality of resource sets.

9. The method according to claim 8, wherein the resource set is selected based on one of RSRP measured for cell reselection and RSRP measured for measurement report triggering, based on whether the first UE is a Radio Resource Control (RRC) IDLE state.

10. A user equipment (UE) for transmitting a Device-to-Device (D2D) signal for D2D communication in a wireless communication system, the UE comprising:
a transmitter and a receiver; and
a processor that:
selects a resource set among a plurality of resource sets configured for the D2D communication, and
controls the transmitter to transmit the D2D signal using at least one radio resource corresponding to the resource set,
wherein a reference cell for synchronization for transmitting the D2D signal is determined, among cells associated with the plurality of resource sets, based on whether the first UE is in a Radio Resource Control (RRC) IDLE state.

11. The user equipment (UE) according to claim 10, wherein the resource set is selected based on reference signal received power (RSRP) of the cells associated with the plurality of resource sets.

12. The user equipment (UE) according to claim 11, wherein the resource set is selected based on one of RSRP measured for cell reselection and RSRP measured for measurement report triggering, based on whether the first UE is a Radio Resource Control (RRC) IDLE state.

* * * * *